United States Patent
Ye et al.

(10) Patent No.: US 11,613,215 B2
(45) Date of Patent: Mar. 28, 2023

(54) APPARATUS AND METHOD FOR DETECTING A BATTERY DISCHARGING CAUSE FOR A VEHICLE

(71) Applicants: HYUNDAI MOTOR COMPANY, Seoul (KR); KIA MOTORS CORPORATION, Seoul (KR)

(72) Inventors: Kwang Hae Ye, Seoul (KR); Seok Min Kim, Incheon (KR); Hyun Wook Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 537 days.

(21) Appl. No.: 16/782,821

(22) Filed: Feb. 5, 2020

(65) Prior Publication Data
US 2021/0114535 A1    Apr. 22, 2021

(30) Foreign Application Priority Data

Oct. 21, 2019  (KR) .......................... 10-2019-0130840

(51) Int. Cl.
*B60R 16/023*  (2006.01)
*G07C 5/08*  (2006.01)
(Continued)

(52) U.S. Cl.
CPC .......... *B60R 16/0232* (2013.01); *B60L 58/10* (2019.02); *G06F 1/3212* (2013.01);
(Continued)

(58) Field of Classification Search
CPC . B60R 16/0232; B60R 16/023; B60R 16/033; B60L 58/10; G06F 1/3212;
(Continued)

(56) References Cited

U.S. PATENT DOCUMENTS

2007/0188150 A1* 8/2007 Yamaguchi ......... H02J 7/00304
                                                                    320/136
2007/0247106 A1* 10/2007 Kawahara ............... B60L 58/22
                                                                    320/104
(Continued)

*Primary Examiner* — Shardul D Patel
(74) *Attorney, Agent, or Firm* — Lempia Summerfield Katz LLC

(57) ABSTRACT

An apparatus for detecting a battery discharge cause for a vehicle includes a communicator connected to and configured to communicate with a plurality of controllers, and a monitor configured to monitor a communication state of the controllers to detect a battery discharge cause through the communicator. The monitor monitors the communication state of the controllers to check whether a controller in a communication-enabled state is present when the plurality of controllers is in a state of always-on power (power B+). The monitor checks whether the controller is maintained in the communication-enabled state until a preset amount of time elapses when a controller in a communication-enabled state is present. The monitor detects a communication non-sleep controller based on the controller maintained in the communication-enabled state until the preset amount of time elapses.

20 Claims, 4 Drawing Sheets

(51) Int. Cl.
  *G07C 5/10* (2006.01)
  *B60L 58/10* (2019.01)
  *G06F 1/3212* (2019.01)
  *G06F 3/06* (2006.01)
  *G07C 5/00* (2006.01)

(52) U.S. Cl.
  CPC .......... *G06F 3/0619* (2013.01); *G06F 3/0685* (2013.01); *G07C 5/006* (2013.01); *G07C 5/0808* (2013.01); *G07C 5/0825* (2013.01); *G07C 5/10* (2013.01)

(58) Field of Classification Search
  CPC ..... G06F 3/0619; G06F 3/0685; G07C 5/006; G07C 5/0808; G07C 5/0825; G07C 5/10; G07C 2205/02; Y02T 10/70; G01R 31/007; G01R 31/382
  USPC ........................................................ 713/340
  See application file for complete search history.

(56) References Cited

U.S. PATENT DOCUMENTS

| | | | |
|---|---|---|---|
| 2009/0091332 A1* | 4/2009 | Emori ................... | H02J 7/0019 324/537 |
| 2016/0159243 A1* | 6/2016 | Park ...................... | B60L 3/0046 320/136 |
| 2019/0190294 A1* | 6/2019 | Sato ........................ | B60L 50/51 |
| 2019/0285703 A1* | 9/2019 | Uva ...................... | G01R 31/396 |
| 2020/0376979 A1* | 12/2020 | Liang ........................ | B60L 3/12 |

\* cited by examiner

APPARATUS AND METHOD FOR DETECTING A BATTERY DISCHARGING CAUSE FOR A VEHICLE

CROSS-REFERENCE TO RELATED APPLICATION(S)

This application claims the benefit of priority to Korean Patent Application No. 10-2019-0130840, filed on Oct. 21, 2019, which is hereby incorporated by reference in its entirety herein.

BACKGROUND OF THE INVENTION

Field of the Invention

The present disclosure relates to an apparatus for detecting a battery discharge cause for a vehicle, and more particularly, to an apparatus and method for detecting non-operating controllers that consume always-on power among non-operating controllers of the vehicle.

Discussion of the Related Art

In general, various controllers for performing various control functions are applied to vehicles.

With regard to such vehicle controllers, some controllers having a condition, not requiring an operation in a state of always-on power (power B+), wake up or do not enter the sleeping state, and thus use battery power.

In this case, the controllers that do not operate in the state of always-on power (power B+) cause battery discharge, and thus the lifespan of the battery is reduced.

There is a need to analyze, during development or after mass production, a battery discharge cause of a malfunctioning vehicle, a battery of which is being discharged. However, it is difficult to recognize a controller that operates abnormally among numerous controllers applied to the vehicle. It is also difficult to recognize the time point and the conditions under which the controller is abnormally operated. Accordingly, it is difficult to analyze the cause and to overcome the cause.

Accordingly, there is a need to develop a vehicle battery discharge cause detection apparatus for monitoring vehicle controllers in a state of always-on power (power B+) and detecting the battery discharge cause.

SUMMARY OF THE INVENTION

An object of the present disclosure is to provide an apparatus and method for detecting a battery discharge cause for a vehicle. The apparatus and method may detect a battery discharge cause due to an abnormal operation of the controller by monitoring a controller in a communication-enabled state for a preset amount of time in the state of always-on power (power B+).

The technical problems solved by the embodiments are not limited to the above technical problems. Other technical problems, which are not described herein, should become apparent to those having ordinary skill in the art from the following description.

To achieve these objects and other advantages, and in accordance with the purpose of the disclosure, as embodied and broadly described herein, the present disclosure provides an apparatus for detecting a battery discharge cause for a vehicle. The apparatus includes a communicator connected to and configured to communicate with a plurality of controllers. The apparatus also includes a monitor configured to monitor a communication state of a controller to detect a battery discharge cause through the communicator. The monitor is configured to monitor the communication states of the plurality of controllers to check whether a controller in a communication-enabled state is present when the plurality of the controllers is in states of always-on power (power B+). The monitor is also configured to check whether the controller is maintained in the communication-enabled state until a preset amount of time elapses when the controller in the communication-enabled state is present. The monitor is also configured to detect a communication non-sleep controller based on the controller maintained in the communication-enabled state until the preset amount of time elapses.

According to another embodiment, the present disclosure provides a method of detecting a battery discharge cause by a vehicle battery discharge cause detection apparatus. The apparatus includes a monitor for monitoring a communication state of a controller. The method includes checking, by the monitor, whether a controller in a communication-enabled state is present in a state of always-on power (power B+). The method also includes checking, by the monitor, whether the controller is maintained in the communication-enabled state until a preset amount of time elapses when the controller in the communication-enabled state is present. The method also includes detecting, by the monitor, the controller as a communication non-sleep controller when the controller is maintained in the communication-enabled state.

According to another embodiment, the present disclosure provides a computer-readable recording medium having recorded thereon a program for executing a method of detecting a battery discharge cause by using a vehicle battery discharge cause detection apparatus. The medium may perform procedures provided by the method of detecting the battery discharge cause by using the vehicle battery discharge cause detection apparatus.

According to another embodiment, a vehicle includes a plurality of controllers and an apparatus is configured to detect a battery discharge cause for the vehicle by monitoring communication states of the plurality of controllers. The apparatus for detecting the battery discharge cause for the vehicle is configured to monitor the communication states of the plurality of controllers to check whether a controller in a communication-enabled state is present when the plurality of controllers is in states of always-on power (power B+). The monitor is also configured to check whether the controller is maintained in the communication-enabled state until a preset amount of time elapses when the controller in the communication-enabled state is present. The monitor is also configured to detect a communication non-sleep controller based on the controller maintained in the communication-enabled state until the preset amount of time elapses.

BRIEF DESCRIPTION OF THE DRAWINGS

The accompanying drawings provide a further understanding of the disclosure and are incorporated herein to constitute a part of this application. The drawings illustrate embodiment(s) of the present disclosure and together with the description serve to explain the principle of the present disclosure. In the drawings.

DETAILED DESCRIPTION OF THE INVENTION

Figure 1:
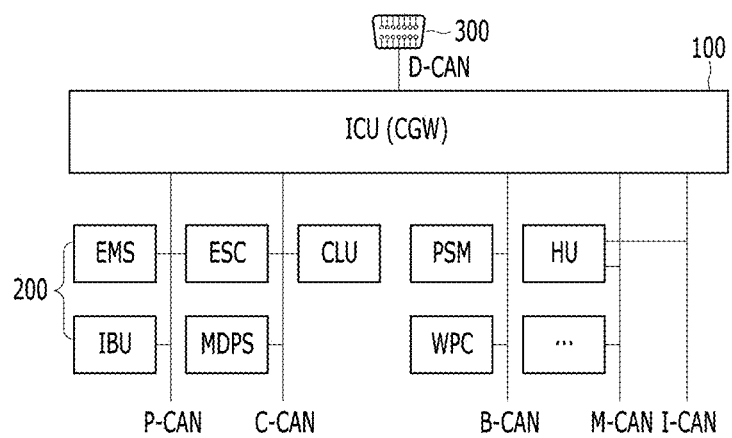
FIG. 1 is a diagram for explaining a vehicle comprising an apparatus for detecting a battery discharge cause for a vehicle according to an embodiment of the present disclosure.

Embodiments of the present disclosure are described in detail so as for those having ordinary skill in the art to easily implement the present disclosure with reference to the accompanying drawings. However, the present disclosure may be implemented in various different forms and is not limited to these embodiments. To clearly describe the present disclosure, a part without concerning to the description is omitted in the drawings. The same reference numerals in the specification denote the same or equivalent elements.

Throughout the specification, one of ordinary skill in the art should understand terms such as "include," "comprise," and "have" should be interpreted by default as inclusive or open-ended rather than exclusive or closed-ended unless expressly defined to the contrary. Further, terms such as "unit," "module," etc. disclosed in the specification mean units for processing at least one function or operation, which may be implemented by hardware, software, or a combination thereof.

Throughout the specification, when a certain part "includes" or "comprises" a certain component, this indicates that the part may further include or comprise another component instead of excluding another component unless there is no different disclosure. The same reference numbers are used throughout the drawings to refer to the same parts.

Hereinafter, an apparatus and method for detecting a battery discharge cause of a vehicle applicable to the embodiments of the present disclosure are described in detail with reference to FIGS. 1-4.

FIG. 1 is a diagram for explaining a vehicle including an apparatus for detecting a battery discharge cause for a vehicle according to an embodiment of the present disclosure.

As shown in FIG. 1, the vehicle may include a plurality of controllers 200 and a vehicle battery discharge cause detection apparatus 100 for monitoring a communication state of the plurality of controllers 200 and detecting a battery discharge cause.

The vehicle battery discharge cause detection apparatus 100 may be connected to and communicate with an on-board diagnosis (OBD) connector 300 connected to an external diagnostic device.

For example, the vehicle battery discharge cause detection apparatus 100 may be included in an immobilizer control unit (ICU) or a central gate way (CGW), which is connected to and communicates with the plurality of controllers 200.

Here, the vehicle battery discharge cause detection apparatus 100 may be connected to and communicate with the plurality of controllers 200 and the OBD connector 300 using at least one of a controller area network (CAN) communication or a CAN with a flexible data-rate (CAN-FD) communication.

The vehicle battery discharge cause detection apparatus 100 may monitor a communication state of the plurality of controllers to check whether a controller in a communication-enabled state is present when a plurality of controllers is in the state of always-on power (power B+). The apparatus 100 may check whether the controller is maintained in the communication-enabled state up to the time point at which, i.e., until a preset amount of time elapses when the controller in the communication-enabled state is present. The apparatus 100 may detect a communication non-sleep controller based on the controller maintained in the communication-enabled state until the preset amount of time elapses.

Here, when checking whether the controller in the communication-enabled state is present, the vehicle battery discharge cause detection apparatus 100 may check whether a controller connected to a network using a network manager (NM) is a sleep indication (SleepInd) non-declaring controller. The apparatus 100 may recognize the controller to be in a communication-enabled state when the controller is a SleepInd non-declaring controller.

For example, the controller connected to the network using a network manager (NM) may be a controller connected to a body-CAN (B-CAN) and a multiple-CAN (M-CAN).

If necessary, when checking whether a controller in a communication-enabled state is present, the vehicle battery discharge cause detection apparatus 100 may check whether a message is periodically transmitted to a controller connected to a network to which an NM is not applied. The apparatus 100 may also recognize the controller to be in the communication-enabled state when the controller periodically transmits the message.

For example, the controller connected to the network to which the NM is not applied may be a controller connected to a chassis-CAN (C-CAN) and a powertrain-CAN (P-CAN).

Then, when checking whether the communication-enabled state is maintained, the vehicle battery discharge cause detection apparatus 100 may check whether the controller is maintained in the communication-enabled state from a time point at which a preset amount of time is started until a time point at which the preset amount of time elapses when the controller in the communication-enabled state is present.

For example, when the preset amount of time is about one hour, the vehicle battery discharge cause detection apparatus 100 may detect a controller maintained in the communication-enabled state for about one hour in the state of the always-on power (power B+) as a communication non-sleep controller.

When checking whether the communication-enabled state is maintained, the vehicle battery discharge cause detection apparatus 100 may check whether a communication state of the controller has a termination condition when the controller is not maintained in the communication-enabled state when a preset amount of time elapses. The apparatus 100 may terminate an operation of detecting a battery discharge cause when the communication state of the controller has the termination condition.

Here, the termination condition may include a first condition, in which all of the controllers connected to a network using an NM are SleepInd declaring controllers, and a second condition, in which all of the controllers connected to a network to which an NM is not applied correspond to a communication termination.

Then, when detecting a communication non-sleep controller, the vehicle battery discharge cause detection apparatus 100 may store detection data about the communication non-sleep controller. The apparatus 100 may count the number of times that a communication non-sleep occurs for each controller. The apparatus 100 may store the counted number of times that the communication non-sleep occurs for each controller.

When counting the number of times that the communication non-sleep occurs for each controller, the vehicle battery discharge cause detection apparatus 100 may check whether the number of times that a non-sleep event of a controller occurs reaches a preset number of times. The apparatus 100 may generate and transmit a vehicle check notification when the number of times that the non-sleep event of a controller occurs is the preset number of times.

For example, when the preset number of times is about 10, the vehicle battery discharge cause detection apparatus 100 may generate a vehicle check notification. The apparatus 100 may transmit the generated vehicle check notification in the form of a customer text notification or a vehicle display notification when the number of times that the non-sleep event of the controller occurs is 10.

As such, the vehicle battery discharge cause detection apparatus 100 may determine the controller that continuously performs a communication after one hour elapses since its entry into the state of power B+ to be a non-sleep controller.

For example, a detection condition of a non-sleep controller will now be described.

TABLE 1

| Item | Detection Condition |
| --- | --- |
| Network to which NM is applied (body/multi) | B+ state & SleepInd non-declaring controller in a communication-enabled state & a time point at which one hour elapses |
| Network to which NM is not applied (chassis/PT) | B+ state & controller in a communication-enabled state and continuously and periodically transmitting message & in a time point at which one hour elapses |

A termination condition of the non-sleep controller will now be described.

TABLE 2

| Item | Termination Condition |
| --- | --- |
| Network to which NM is not applied (chassis/PT) | All of the controllers are SleepInd declaring |
| Network to which NM is not applied(chassis/PT) | All of the controllers correspond to a communication termination |

The vehicle battery discharge cause detection apparatus 100 may store reference data such as a non-sleep target controller and the number of detection times to be checked through a diagnostic device.

The vehicle battery discharge cause detection apparatus 100 may generate a vehicle check notification. The apparatus 100 may transmit the generated vehicle check notification in the form of a customer text notification or a vehicle display notification when the number of times that the non-sleep event of a controller occurs reaches 10.

As such, according to the present disclosure, in the state of always-on power (power B+), a controller in a communication-enabled state for a preset amount of time may be monitored and thus a battery discharge cause may be detected.

Specifically, according to the present disclosure, when an issue occurs in terms of battery discharge of a vehicle being developed and a mass-produced vehicle, reference data may be ensured to actively analyze a vehicle battery discharge cause and to establish a method of overcoming the issue. The reference data includes a controller in which the issue of battery discharge occurs due to an abnormal operation, a time point at which the issue occurs, and a frequency at which the issue occurs. Accordingly, the time and expense for analyzing the cause and establishing a method of overcoming the issue may be minimized compared with the conventional case.

According to the present disclosure, when an abnormal operation event of a controller frequently occurs, a vehicle check notification function may be additionally installed to allow a customer to examine a vehicle before a battery discharge issue occurs, thereby preventing a battery discharge issue.

Figure 2:
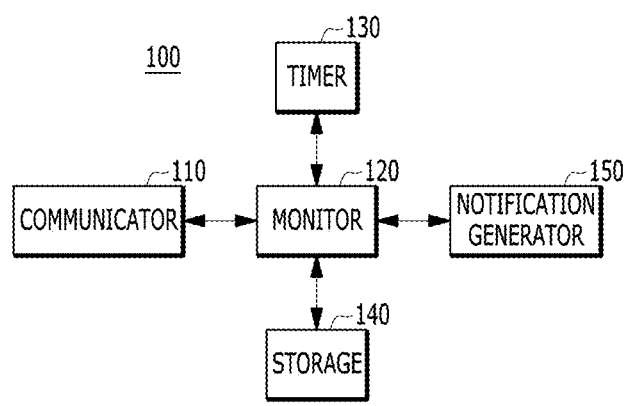
FIG. 2 is a diagram for explaining a vehicle battery discharge cause detection apparatus according to an embodiment of the present disclosure.

FIG. 2 is a diagram for explaining a vehicle battery discharge cause detection apparatus according to an embodiment of the present disclosure.

As shown in FIG. 2, the vehicle battery discharge cause detection apparatus 100 may include a communicator 110 connected to and communicating with a plurality of controllers. The apparatus 100 may also include a monitor 120 configured to monitor communication states of the plurality of controllers through the communicator 110 to detect a battery discharge cause.

Here, the communicator 110 may be connected to and communicate with an on-board diagnosis (OBD) connector connected to an external diagnostic device.

The vehicle battery discharge cause detection apparatus 100 may further include a timer 130 for measuring a preset amount of time.

Here, the monitor 120 may control the timer 130 to measure the preset amount of time when a controller in a communication-enabled state is present.

Specifically, when controlling the timer 130, the monitor 120 may control the timer 130 to begin a measurement of the preset amount of time when the controller in the communication-enabled state is present. When a time point at which the preset amount of time elapses is reached, the monitor 120 may control the timer 130 to terminate the measurement of the preset amount of time.

The vehicle battery discharge cause detection apparatus 100 may further include a storage 140 for storing detection data about a communication non-sleep controller and the number of times that communication non-sleep occurs for each controller.

Here, when detecting the communication non-sleep controller, the monitor 120 may store the detection data about the communication non-sleep controller in the storage 140. The monitor 120 may count the number of times that a communication non-sleep occurs for each controller. The monitor 120 may store the counted number of times that the communication non-sleep occurs for each controller in the storage 140.

For example, the storage 140 may store a non-sleep controller list including the detection data about the communication non-sleep controller and the number of times that communication non-sleep occurs for each controller. The non-sleep controller list also includes diagnosis identification (ID) for each controller.

The vehicle battery discharge cause detection apparatus 100 may further include a notification generator 150 for generating a vehicle check notification according to a control signal of the monitor 120.

Here, the notification generator 150 may generate a vehicle check notification including at least one of a customer text notification or a display device notification.

The vehicle battery discharge cause detection apparatus 100 including the communicator 110 and the monitor 120 may be included in an immobilizer control unit (ICU) or a central gateway (CGW) connected to and communicating with a plurality of controllers.

When the plurality of controllers is in a state of always-on power (power B+), the monitor 120 may monitor the communication states of the plurality of controllers to check whether a controller in a communication-enabled state is present. When a controller in the communication-enabled state is present, the monitor 120 may check whether the controller is maintained in the communication-enabled state until a preset amount of time elapses. The monitor 120 may detect a communication non-sleep controller based on the controller maintained in the communication-enabled state until the preset amount of time elapses.

When checking whether the controller in the communication-enabled state is present, the monitor 120 may check whether the controller is a SleepInd non-declaring controller. When the controller is the SleepInd non-declaring controller, the monitor 120 may recognize the controller as the communication-enabled state.

Here, when checking whether the controller is the SleepInd non-declaring controller, the monitor 120 may check whether a controller connected to a network using a network manager (NM) is applied is a SleepInd non-declaring controller.

Specifically, when checking whether the controller is a SleepInd non-declaring controller, the monitor 120 may check that the controller is a SleepInd non-declaring controller when the controller is not in a state in which the controller receives a request signal from another node and does not transmit a request signal to another node.

If necessary, when checking whether a controller in a communication-enabled state is present, the monitor 120 may check whether the controller periodically transmits a message. When the controller periodically transmits a message, the monitor 120 may recognize the controller to be in a communication-enabled state.

Here, when checking whether the controller periodically transmits a message, the monitor 120 may check whether a controller connected to a network to which a network manager (NM) is not applied periodically transmits a message.

Then, when checking whether the communication-enabled state is maintained, the monitor 120 may control a timer to begin measurement of the preset amount of time when the controller in the communication-enabled state is present. The monitor 120 may check whether the controller is maintained in the communication-enabled state until the preset amount of time elapses from a time point at which the preset amount of time is started.

Here, the preset amount of time may be a minimum of 30 minutes to a maximum of one hour and 30 minutes, but the present disclosure is not limited thereto.

When checking whether the communication-enabled state is maintained, the monitor 120 may check whether a communication state of the controller has a termination condition when the controller is not maintained in the communication-enabled state when the preset amount of time elapses. The monitor 120 may terminate an operation of detecting a battery discharge cause when the communication state of the controller has the termination condition.

For example, the termination condition may include a first condition, in which all of the controllers connected to a network using an NM are SleepInd declaring controllers, and a second condition, in which all of the controllers connected to a network to which an NM is not applied correspond to a communication termination. However, the present disclosure is not limited thereto.

Then, when detecting a communication non-sleep controller, the monitor 120 may store detection data about the communication non-sleep controller. The monitor 120 may count the number of times that communication non-sleep occurs for each controller. The monitor 120 may store the counted number of times that the communication non-sleep occurs for each controller.

When counting the number of times that the communication non-sleep occurs for each controller, the monitor 120 may check whether the number of times that a non-sleep event of a controller occurs is a preset number of times. The monitor 120 may generate and transmit a vehicle check notification when the number of times that the non-sleep event of the controller occurs is the preset number of times.

For example, the preset number of times may be a minimum of 5 to a maximum of 15, but the present disclosure is not limited thereto.

Then, when checking whether the number of times that the non-sleep event of a controller occurs is the preset number of times, the monitor 120 may check whether the communication state of the controller has a termination condition when the number of times that the non-sleep event of the controller occurs is not the preset number of times. The monitor 120 may terminate an operation of detecting a battery discharge cause when the communication state of the controller has a termination condition.

Here, the termination condition may include a first condition in which all of the controllers connected to a network using an NM are SleepInd declaring controllers, and a second condition, in which all of the controllers connected to a network to which an NM is not applied correspond to a communication termination.

Figure 3:
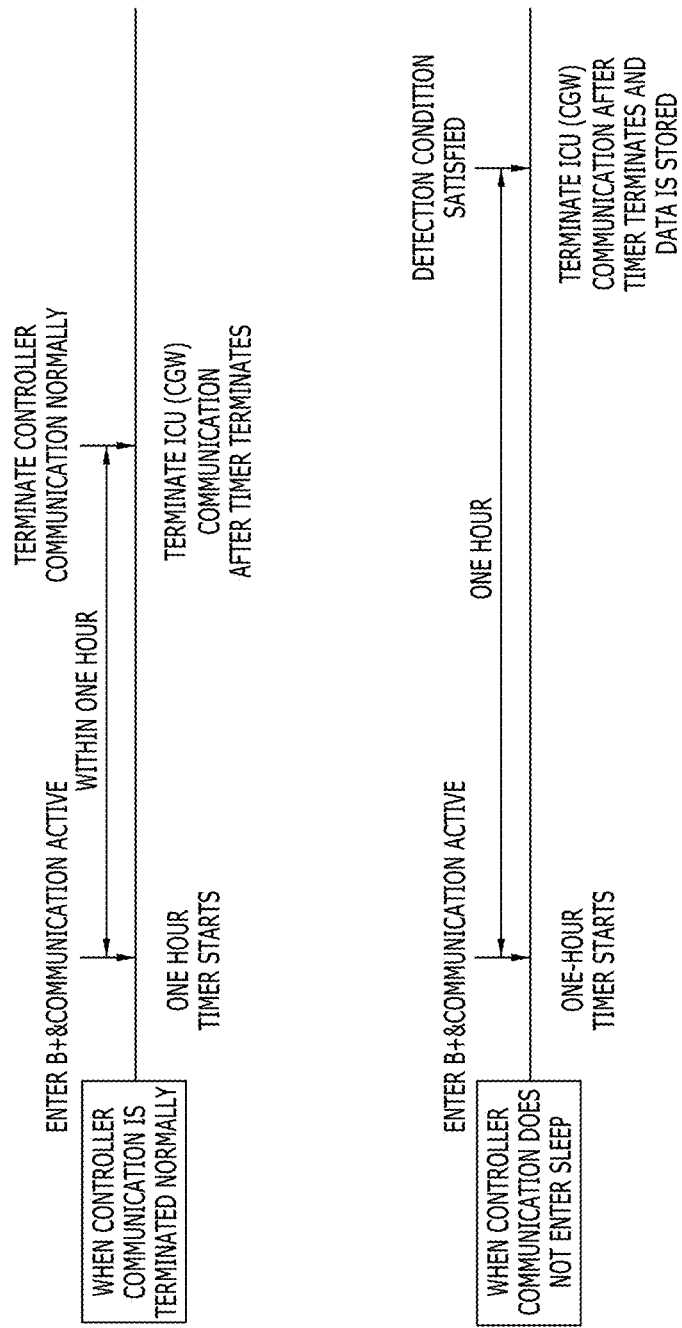
FIG. 3 is a diagram for explaining a method of detecting a communication non-sleep controller based on a setting time according to an embodiment of the present disclosure.

FIG. 3 is a diagram for explaining a method of detecting a communication non-sleep controller based on a setting time according to an embodiment of the present disclosure.

As shown in FIG. 3, the monitor according to the present disclosure may control a timer to begin a measurement of a preset amount of time (e.g., one hour) when a controller in a communication-enabled state is present while the controller is in the state of always-on power (power B+).

The monitor may check whether the controller in the communication-enabled state while being in the state of always-on power (power B+) is maintained in the communication-enabled state until a preset amount of time elapses from a time point at which the preset amount of time is started.

Then, when the communication-enabled state of the controller, which is in the communication-enabled state while being in the state of always-on power (power B+), is terminated before a time point at which the preset amount of time elapses, the monitor may recognize the current state to be a termination of normal communication.

Thus, the monitor may terminate the timer and may terminate an operation of detecting the communication non-sleep controller.

When the controller in the communication-enabled state while being in the state of always-on power (power B+) is maintained in the communication-enabled state until the preset amount of time elapses, a detection condition is satisfied. Thus, the monitor may detect that the corresponding controller is a communication non-sleep controller.

Thus, the monitor may terminate the timer, may store data and the number of detection times of the corresponding controller, and may terminate an operation of detecting the communication non-sleep controller.

Figure 4:
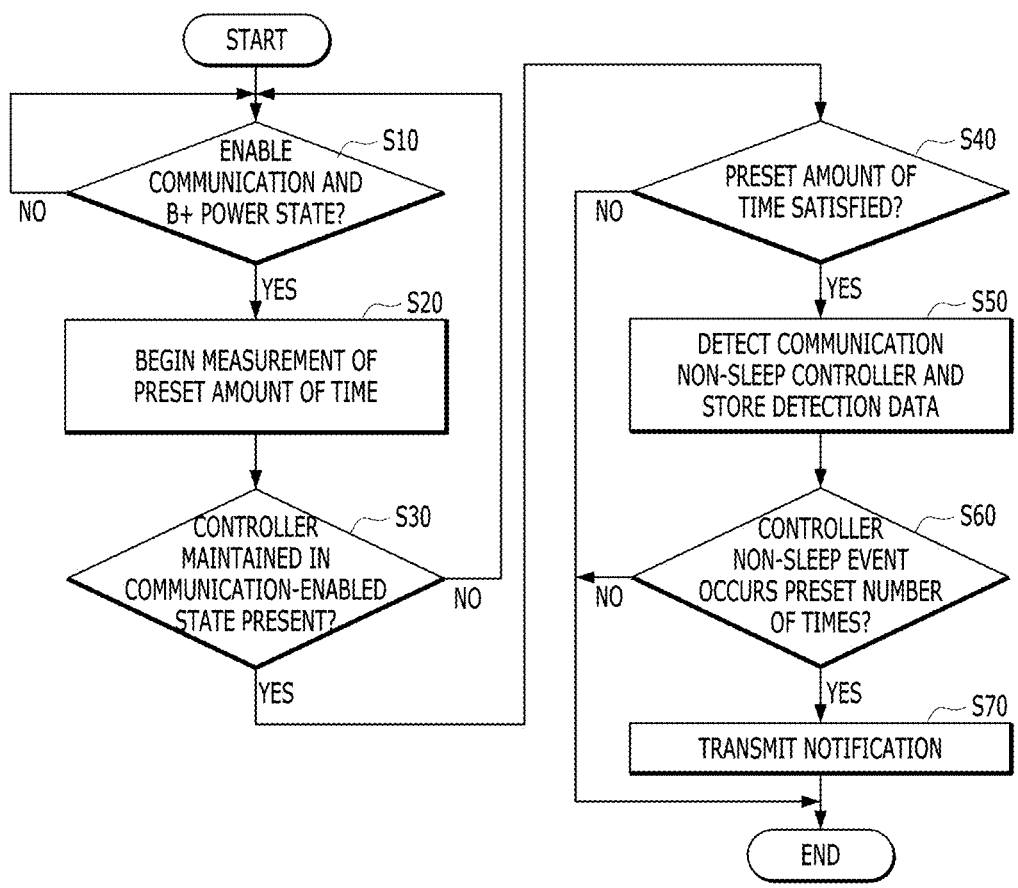
FIG. 4 is a flowchart for explaining a method of detecting a vehicle battery discharge cause according to an embodiment of the present disclosure.

FIG. 4 is a flowchart for explaining a method of detecting a vehicle battery discharge cause according to an embodiment of the present disclosure.

As shown in FIG. 4, first, a monitor according to the present disclosure may check whether a controller in a communication-enabled state is present in the state of always-on power (power B+) (S10).

Then, when the controller in the communication-enabled state is present, the monitor may control a timer to begin a measurement of a preset amount of time (S20).

The monitor may check whether the controller maintained in the communication-enabled state for the preset amount of time is present (S30).

Here, the monitor may check whether the controller is a SleepInd non-declaring controller. When the controller is a SleepInd non-declaring controller, the monitor may recognize the controller to be in a communication-enabled state.

For example, the monitor may check whether a controller connected to a network to which a network manager (NM) is applied is a SleepInd non-declaring controller.

If necessary, the monitor may check whether the controller periodically transmits a message. When the controller periodically transmits a message, the monitor may recognize the controller to be in a communication-enabled state.

For example, whether a controller connected to a network to which an NM is not applied periodically transmits a message may be checked.

Then, the monitor may check whether a condition where the controller is maintained in the communication-enabled state for the preset amount of time is satisfied (S40).

When the condition where the controller is maintained in the communication-enabled state for the preset amount of time is satisfied, the monitor may detect the corresponding controller as the communication non-sleep controller and may store detection data about the communication non-sleep controller (S50).

Then, the monitor may count the number of times that a communication non-sleep occurs for each controller. The monitor may store the counted number of times that the communication non-sleep occurs for each controller.

If necessary, when the condition where the controller is maintained in the communication-enabled state for the preset amount of time is not satisfied, the monitor may check whether the communication state of the controller has a termination condition. When the communication state of the controller has a termination condition, the monitor may terminate the operation of detecting a battery discharge cause.

Here, the termination condition may include a first condition, in which all of the controllers connected to a network using an NM are SleepInd declaring controllers, and a second condition, in which all of the controllers connected to a network to which an NM is not applied correspond to a communication termination.

Then, the monitor may count the number of times that the communication non-sleep occurs for each controller. The monitor may check whether the number of times that a non-sleep event of a controller occurs reaches a preset number of times (S60).

Then, when the number of times that controller non-sleep occurs reaches the preset number of times, the monitor may generate a vehicle check notification. The monitor may transmit the generated vehicle check notification in the form of a customer text notification or a vehicle display notification (S70).

However, when the number of times that the non-sleep event of a controller occurs does not reach the preset number of times, the monitor may check whether the communication state of the controller has a termination condition. When the communication state of the controller has a termination condition, the monitor may terminate an operation of detecting a battery discharge cause.

Here, the termination condition may include a first condition in which all of the controllers connected to a network using an NM are SleepInd declaring controllers, and a second condition in which all of the controllers connected to a network to which an NM is not applied correspond to a communication termination.

As such, according to the present disclosure, while being in the state of always-on power (power B+), the controller in the communication-enabled state for a preset amount of time may be monitored to detect a battery discharge cause.

Specifically, according to the present disclosure, when an issue occurs in terms of battery discharge of a vehicle being developed and a mass-produced vehicle, reference data may be ensured to actively analyze a vehicle battery discharge cause and to establish a method of overcoming the issue. The reference data includes a controller in which the battery discharge issue occurs due to an abnormal operation, a time point at which the issue occurs, and a frequency at which the issue occurs. Accordingly, the time and expense for analyzing the cause and establishing a method of overcoming the issue may be minimized compared with the conventional case.

According to the present disclosure, when an abnormal operation event of a controller frequently occurs, a vehicle check notification function may be additionally installed to allow a customer to examine a vehicle before a battery discharge issue occurs, thereby preventing a battery discharge issue.

The present disclosure may provide a computer-readable recording medium having recorded thereon a program for executing the method of detecting a battery discharge cause by using a vehicle battery discharge cause detection apparatus. The medium may perform procedures provided by the method of detecting the battery discharge cause by using the vehicle battery discharge cause detection apparatus according to an embodiment of the present disclosure.

A vehicle according to an embodiment of the present disclosure may include a plurality of controllers and a vehicle battery discharge cause detection apparatus for monitoring a communication state of the plurality of controllers to detect a battery discharge cause. The vehicle battery discharge cause detection apparatus may monitor the communication states of the plurality of controllers to check whether a controller in a communication-enabled state is present when the plurality of controllers is in the state of always-on power (power B+). The apparatus may check whether the controller is maintained in the communication-enabled state until a preset amount of time elapses when the controller in the communication-enabled state is present. The apparatus may detect a communication non-sleep controller based on the controller maintained in the communication-enabled state until the preset amount of time elapses.

The apparatus and method of detecting the vehicle battery discharge cause according to at least one embodiment of the present disclosure as configured above may monitor a controller in a communication-enabled state for a preset amount of time to detect a battery discharge cause while the controller is in the state of always-on power (power B+).

Specifically, according to the present disclosure, when an issue occurs in terms of battery discharge of a vehicle being developed and a mass-produced vehicle, reference data may be ensured to actively analyze a vehicle battery discharge cause and to establish a method of overcoming the issue. The reference data includes a controller in which a battery discharge issue occurs due to an abnormal operation, a time point at which the issue occurs, and a frequency at which the issue occurs. Accordingly, the time and expense for analyzing the cause and establishing a method of overcoming the issue may be minimized compared with the conventional case.

According to the present disclosure, when an abnormal operation event of a controller frequently occurs, a vehicle check notification function may be additionally installed to allow a customer to examine a vehicle before a battery discharge issue occurs, thereby preventing such a battery discharge issue.

It should be appreciated by those having ordinary skill in the art that the effects achieved with the present disclosure are not limited to what has been particularly described hereinabove. Other advantages of the present disclosure is more clearly understood from the detailed description.

The aforementioned present disclosure can also be embodied as computer readable code stored on a computer readable recording medium. The computer readable recording medium is any data storage device that can store data readable by a computer. Examples of the computer readable recording medium include a hard disk drive (HDD), a solid state drive (SSD), a silicon disc drive (SDD), a read-only memory (ROM), a random-access memory (RAM), a CD-ROM, magnetic tapes, floppy disks, optical data storage devices, and carrier waves (e.g., transmission via the Internet), etc.

It should be apparent to those having ordinary skill in the art that various modifications and variations can be made in the present disclosure without departing from the spirit or scope of the embodiments. Thus, it is intended that the present disclosure cover the modifications and variations of the embodiments provided they come within the scope of the appended claims and their equivalents.

What is claimed is:

1. An apparatus for detecting a battery discharge cause for a vehicle, the apparatus comprising:
  a communicator connected to and configured to communicate with a plurality of controllers; and
  a monitor configured to monitor a communication state of the plurality of controllers to detect a battery discharge cause through the communicator,
  wherein the monitor is configured to monitor the communication state of the plurality of controllers to check whether a controller in a communication-enabled state is present when the plurality of controllers is in a state of always-on power (power B+),
  wherein the monitor is configured to check whether the controller is maintained in the communication-enabled state until a preset amount of time elapses when the controller in the communication-enabled state is present, and
  wherein the monitor is configured to detect a communication non-sleep controller based on the controller maintained in the communication-enabled state until the preset amount of time elapses.

2. The apparatus of claim 1, further comprising a timer configured to measure the preset amount of time, wherein the monitor is configured to control the timer to measure the preset amount of time when the controller in the communication-enabled state is present.

3. The apparatus of claim 1, wherein when checking whether the controller in the communication-enabled state is present, the monitor is configured to check whether the controller is a sleep indication (SleepInd) non-declaring controller, and wherein, when the controller is the SleepInd non-declaring controller, the monitor is configured to recognize the controller to be in the communication-enabled state.

4. The apparatus of claim 1, wherein when checking whether the controller in the communication-enabled state is present, the monitor is configured to check whether the controller periodically transmits a message, and wherein, when the controller periodically transmits the message, the monitor is configured to recognize the controller to be in the communication-enabled state.

5. The apparatus of claim 1, wherein when checking whether the communication-enabled state is maintained, the monitor is configured to control a timer to begin a measurement of the preset amount of time when the controller in the communication-enabled state is present, and configured to check whether the controller is in the communication-enabled state until the preset amount of time elapses from a time point at which the preset amount of time is started.

6. The apparatus of claim 1, further comprising a storage configured to store detection data about the communication non-sleep controller and a number of times that communication non-sleep occurs for each controller,
  wherein the monitor is configured to store the detection data about the communication non-sleep controller in the storage when detecting the communication non-sleep controller,
  wherein the monitor is configured to count the number of times that the communication non-sleep occurs for each controller, and
  wherein the monitor is configured to store the counted number of times that the communication non-sleep occurs for each controller in the storage.

7. The apparatus of claim 6, wherein the storage stores a non-sleep controller list that includes the detection data about the communication non-sleep controller and the counted number of times that the communication non-sleep occurs for each controller and includes diagnosis identification (ID) for each controller.

8. The apparatus of claim 1, wherein when detecting the communication non-sleep controller, the monitor is configured to store detection data about the communication non-sleep controller, configured to count a number of times that communication non-sleep occurs for each controller, and configured to store the counted number of times that the communication non-sleep occurs for each controller.

9. The apparatus of claim 8, wherein when counting the number of times that the communication non-sleep occurs for each controller, the monitor is configured to check whether the number of times that a non-sleep event of the controller occurs is a preset number of times, and
  wherein the monitor is configured to generate and transmit a vehicle check notification when the number of times that the non-sleep event of the controller is the preset number of times.

10. The apparatus of claim 1, further comprising:
  a notification generator configured to generate a vehicle check notification according to a control signal of the monitor.

11. The apparatus of claim 1, wherein the communicator is connected to and configured to communicate with an on board diagnosis (OBD) connector connected to an external diagnostic device.

12. A method of detecting a battery discharge cause by using a vehicle battery discharge cause detection apparatus comprising a monitor for monitoring a communication state of a controller, the method comprising:
    checking, by the monitor, whether a controller in a communication-enabled state is present while the controller is in a state of always-on power (power B+);
    checking, by the monitor, whether the controller is maintained in the communication-enabled state until a preset amount of time elapses when the controller in the communication-enabled state is present; and
    detecting, by the monitor, the controller as a communication non-sleep controller when the controller is maintained in the communication-enabled state.

13. The method of claim 12, wherein the checking whether the controller in the communication-enabled state is present comprises:
    checking whether the controller is a sleep indication (SleepInd) non-declaring controller; and
    recognizing the controller to be in the communication-enabled state when the controller is the SleepInd non-declaring controller.

14. The method of claim 12, wherein the checking whether the controller in the communication-enabled state is present includes:
    checking whether the controller periodically transmits a message; and
    when the controller periodically transmits the message, recognizing the controller to be in the communication-enabled state.

15. The method of claim 12, wherein the checking whether the controller is maintained in the communication-enabled state comprises:
    beginning measurement of the preset amount of time when the controller in the communication-enabled state is present;
    checking whether the controller maintained in the communication-enabled state is present; and
    when the controller maintained in the communication-enabled state is present, checking whether a current time point is a time point at which the preset amount of time elapses.

16. The method of claim 12, wherein the checking whether the controller is maintained in the communication-enabled state includes
    checking whether the communication state of the controller has a termination condition when the controller is not maintained in the communication-enabled state when the preset amount of time elapses; and
    terminating an operation of detecting the battery discharge cause when the communication state of the controller has the termination condition.

17. The method of claim 12, wherein the detecting the controller as the communication non-sleep controller includes:
    when detecting the communication non-sleep controller, storing detection data about the communication non-sleep controller;
    counting a number of times that communication non-sleep occurs for each controller; and
    storing the counted number of times that the communication non-sleep occurs for each controller.

18. The method of claim 17, further comprising:
    checking whether a number of times that a non-sleep event of the controller occurs is a preset number of times; and
    when the number of times that the non-sleep event of the controller occurs is the preset number of times, generating and transmitting a vehicle check notification.

19. A non-transitory computer-readable recording medium containing a program for executing the method of claim 12.

20. A vehicle comprising:
    a plurality of controllers; and
    an apparatus configured to detect a battery discharge cause for the vehicle by monitoring a communication state of the plurality of the controllers,
    wherein the apparatus for detecting the battery discharge cause for the vehicle is configured to monitor the communication state of the plurality of controllers to check whether a controller in a communication-enabled state is present when the plurality of controllers is in a state of always-on power (power B+),
    wherein the apparatus is configured to check whether the controller is maintained in the communication-enabled state until a preset amount of time elapses when the controller in the communication-enabled state is present, and
    wherein the apparatus is configured to detect a communication non-sleep controller based on the controller maintained in the communication-enabled state until the preset amount of time elapses.

* * * * *